United States Patent [19]

Heckmann et al.

[11] Patent Number: 4,486,392
[45] Date of Patent: Dec. 4, 1984

[54] PROCESS FOR THE SELECTIVE SEPARATION OF URANIUM FROM ACCOMPANYING METALS

[75] Inventors: Klaus Heckmann; Jiri Spurny, both of Regensburg, Fed. Rep. of Germany

[73] Assignee: Kernforschungszentrum Karlsruhe GmbH, Karlsruhe, Fed. Rep. of Germany

[21] Appl. No.: 296,440

[22] Filed: Aug. 26, 1981

[30] Foreign Application Priority Data

Apr. 19, 1978 [DE] Fed. Rep. of Germany ....... 2817029
Jan. 23, 1979 [DE] Fed. Rep. of Germany ....... 2902516

[51] Int. Cl.$^3$ .............................................. C01G 43/00
[52] U.S. Cl. ......................................... 423/11; 423/18
[58] Field of Search ..................................... 423/11, 18

[56] References Cited

FOREIGN PATENT DOCUMENTS 1166113 3/1964 Fed. Rep. of Germany .
1175622 8/1964 Fed. Rep. of Germany ........ 423/11
911792 11/1962 United Kingdom .

Primary Examiner—Edward A. Miller
Attorney, Agent, or Firm—Schwartz, Jeffery, Schwaab, Mack, Blumenthal & Koch

[57] ABSTRACT

Disclosed is a process for the selective separation of uranium from metals accompanying it in a uranium-containing ore, comprising the steps of preparing a uranium-containing solution; adding to the solution (i) hydrochloric acid in an amount sufficient to form complex anions of the type $$(UO_2Cl_n)^{n-2}$$

wherein n is 3 or 4, or (ii) sulfuric acid in an amount sufficient to form complex anions of the type $$UO_2(SO_4)_m{}^{2-2m}$$

wherein m is 2 or 3; adding to the solution a cationic surface active agent which forms a relating insoluble precipitate with the complex anion; subjecting the solution containing said precipitate to a gas flotation step; separating the foam fraction from the liquid fraction; and recovering uranium from the foam fraction. Also disclosed is an apparatus for carrying out the process.

25 Claims, 1 Drawing Figure

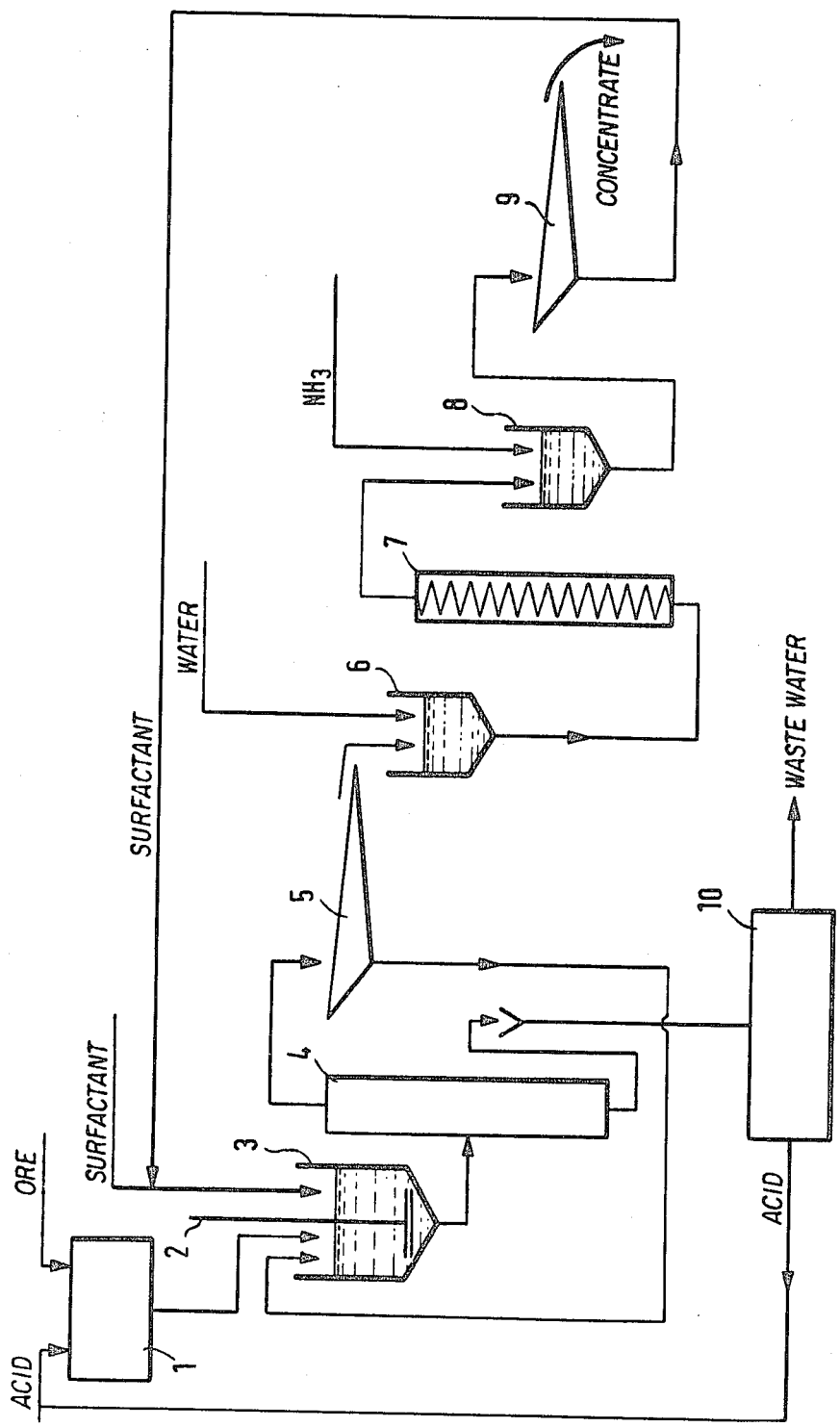

PROCESS FOR THE SELECTIVE SEPARATION OF URANIUM FROM ACCOMPANYING METALS

This is a continuation of application Ser. No. 31,273, filed Apr. 18, 1979, now abandoned.

BACKGROUND OF THE INVENTION

The invention concerns a process for the selective separation of uranium from its accompanying metals and its extraction by means of treating an aqueous acid solution of uranium with a collector, foaming it by the introduction by flowing of an inert gas, removing the foam, isolating the uranium and recovering the collector from the foam.

The importance of uranium has been increasing steadily in recent years, because at the present time it is the most important nuclear fuel. The demand for uranium is therefore rising constantly.

In nature, uranium compounds are found in numerous rock formations, but their concentrations in uranium are very low and generally are under 0.04%. Uranium ores are concentrated by means of conventional processes, by flotation, magnetic separation and other processes, and then the uranium is generally extracted from the ores.

In the wet processing of ores containing uranium, liquors containing very low concentrations are obtained, particularly in comparison with the concentration of the accompanying metals, especially iron, aluminum and calcium. Available processes for the extraction of uranium, for example, the ion exchange methods or liquid extraction processes, are time consuming and expensive and comprise several stages.

The problem of recovering uranium in the wet metallurgical processing of spent fuel of nuclear power plants presents itself in a somewhat different but fundamentally similar manner. Here the relative proportion of uranium is significantly higher than in ores poor in uranium. There exists therefore a need for a simple process, whereby uranium may be separated selectively from its accompanying metals, especially iron, but also aluminum and calcium and other metals.

German Auslegeschrift (DT-AS) No. 1,166,113 describes a flotation process for inorganic ions, wherein, depending on the charge of the ions to be floated, an anionic or cationic collector is added to the solution containing the ions, whereupon the insoluble reaction product formed is placed into suspension by means of blowing in a gas and is removed in the form of foam. The process is also suitable for the separation of uranium in solutions of uranyl sulfate. If the solution additionally contains iron, it must be specially treated prior to the flotation. The iron (III) ions must be precipitated with ammonia as iron hydroxide, and sulfuric acid must be added until the iron hydroxide just begins to dissolve. This takes place at a pH value of approximately 3.7. In such a solution, the iron is present as $Fe^{+++}$ and the uranium as a mixture of $UO_2(SO_4)_2^{2-}$, $UO_2(SO_4)_3^{4-}$ and $UO_2^{2+}$.

If the pH value falls below 3.7, sulfate complexes of $Fe^{+++}$ are increasingly formed, which are capable of floating together with the sulfate complexes of $UO_2^{2+}$. It is therefore necessary to maintain the concentration of sulfuric acid during the entire flotation process constant at a pH value of 3.7. This requires an unnecessary amount of control. The value of the above-mentioned process is further diminished by the fact that the collector must be added below its critical micelle concentration (cmc), because otherwise the efficiency of the process will be strongly reduced.

The above-mentioned process does not recite the separation of uranium from solutions containing salts in addition to iron sulfate.

The lowest $H_2SO_4$ concentrations required for the leaching of lean ores depend on the composition of the ore and are between 0.1 and 1.0 Molar. The $H_2SO_4$ concentration therein is high enough so that the iron already forms sulfate complexes to a considerable extent. A pretreatment of such solutions by precipitating the iron with $NH_3$ and subsequent acidification with $H_2SO_4$ until the precipitate disappears, leads to the loss of the major part of the sulfuric acid, which is thus lost for reuse in the course of the process, and to additional expense for $NH_3$.

The sulfuric acid-containing liquors of domestic lean ores are such that the neutralization of the sulfuric acid with $NH_3$ results immediately in the precipitation of a voluminous deposit. Even though this precipitate is readily flotated, it contains only traces of uranium. During the redissolution of the precipitate with the least possible amount of sulfuric acid, a pH value of 1.5 to 2.0 is immediately attained.

The process known from DT-AS No. B 1,166,113 therefore cannot be applied on an industrial scale and is especially not suited to the processing of low concentration uranium ores.

SUMMARY OF THE INVENTION

It is therefore an object of the present invention to provide a simple process for the selective separation of uranium from its accompanying metals.

It is a further object of the invention to provide such a process which is suitable for the extraction of uranium from the liquors of the wet metallurgical processing of uranium-containing ores and the recovery of uranium from the spent fuel of nuclear power plants and does not exhibit the disadvantages of the known processes.

It is also an object of the present invention to provide an apparatus for carrying out the improved process according to the invention.

In accomplishing the foregoing objects, there has been provided in accordance with the present invention a process for the selective separation of uranium from metals accompanying it in a uranium-containing ore, comprising the steps of: (a) preparing a uranium-containing solution; (b) adding to the solution (i) hydrochloric acid in an amount sufficient to form complex anions of the type $(UO_2Cl_n)^{n-2}$ wherein n is 3 or 4, or (ii) sulfuric acid in an amount sufficient to form complex anions of the type $UO_2(SO_4)_m^{2-2m}$ wherein m is 2 or 3; (c) adding to the solution a cationic surface active agent which forms a relatively insoluble precipitate with the complex anion; (d) subjecting the solution containing the precipitate to a gas flotation step to produce a foam fraction containing the precipitate and a liquid fraction; (e) separating the foam fraction from the liquid fraction; and (f) recovering uranium from the foam fraction.

In accordance with another aspect of the present invention, there has been provided an apparatus for carrying out the process of the invention. The apparatus comprises: a uranium extraction vessel having an inlet for uranium ore and for the acid and an outlet for acidic uranium-containing solution; a mixing vessel, having an agitator, connected downstream from the outlet, the mixing vessel having an inlet for the solution and for the surface active agent and an outlet for a mixture of solution and surface active agent; a flotation vessel connected downstream from the mixing vessel outlet; means, connected to the flotation vessel, for separating precipitate contained in the foam produced in the flotation vessel from liquid; means attached downstream to the separation means for suspending separated precipitate in an aqueous medium; means for heating the suspension produced in the suspending means; a precipitating vessel having an inlet for the heated suspension and for a basic substance; and means, connected downstream of the precipitating vessel for separating precipitate from the basic substance-containing aqueous medium.

Other objects, features and advantages of the invention will become readily apparent from the detailed description of preferred embodiments which follows, when considered in light of the attached drawing.

BRIEF DESCRIPTION OF THE DRAWING

In the drawing, the process according to the present invention and the apparatus for carrying out the process are schematically illustrated.

DETAILED DESCRIPTION OF PREFERRED EMBODIMENTS

In accordance with one embodiment of the present invention, it was discovered surprisingly that the extraction of uranium from aqueous solutions is possible, if the flotation process is effected in a uranium-containing solution of hydrochloric acid, while using a cationic surface active agent in said flotation. This embodiment of the invention thus consists of a process for the selective separation of uranium from its accompanying metals and for its extraction by means of the treatment of an aqueous uranium solution with a collector, foaming by means of the injection of air or of a gas and removal of the foam. This embodiment of the process is characterized by the fact that hydrochloric acid is added to a solution containing uranium in amounts so that the uranium forms complex anions of the type of $(UO_2Cl_n)^{n-2}$, wherein n equals 3 and 4, that a cationic surface active agent is added together with the hydrochloric acid or after said hydrochloric acid has been added to the solution of uranium, that the solution is flotated in at least one flotation cell, hat the foam and the residual solution are separated in a conventional manner and that the uranium is recovered from the foam. In a preferred embodiment, the foam containing the precipitate is extensively dehydrated by filtering or a similar process, the precipitate suspended in a small amount of water, the suspension heated so that a solution is formed, the uranium precipitated from the uranium solution as the uranate by increasing the pH value and recycling the filtrate containing the surface active agent into the flotation process.

Another embodiment of the invention differs from the above-described embodiment in that, in place of the hydrochloric acid of higher concentration, dilute or moderately concentrated sulfuric acid is used, such as is customarily used in the leaching of uranium-containing ores. Sulfuric acid is less expensive per mole than hydrochloric acid and it is employed in the dilute form only; both of these conditions affect the costs of the process. Furthermore, the sulfuric acid presents a lesser waste disposal problem at the end of several flotation cycles than hydrochloric acid. The use of sulfuric acid in the leaching of ores has the additional effect that radium will not be co-extracted. If the extraction of radium is desired, leaching with hydrochloric acid is recommended.

The flotation of uranium from a sulfuric acid solution with the aid of didodecyldimethylammonium bromide and lauryl pyridinium chloride is described in fundamental terms in DT-AS No. 1,166,113. This process is poorly suited for the separation of uranium from iron. The essential reason therefor is that according to the process of DT-AS No. 1,166,113, the flotation process takes place in a solution wherein uranium is present in the form of an anionic complex, whereas the simultaneously occurring iron is in the form of a cation. This is possible only when the pH value is carefully adjusted to 3.7. This known process is based on the assumption that, in strong acid solutions, not only sulfatouranates but also sulfatoferrates are formed and that simultaneous flotation of both of the ions would take place.

It has now been surprisingly discovered that this assumption is false and that uranium may be flotated from both highly and weakly concentrated sulfuric acid solutions as the sulfate complex in the presence of sulfatoferrates, in a practically quantitative manner, when cationic surface active agents which form low solubility precipitates with sulfatouranates, but not with sulfatoferrates, are used. The exact concentration of the sulfuric acid depends on the concentration of the uranyl ions. Particularly suitable for this purpose are cetylpyridinium chloride (or sulfate) and octadecylpyridinium chloride (or sulfate). The lauryl pyridinium chloride used in DT-AS No. 1,166,113 requires extraordinarily long flotation times and provides very low yields.

Thus, according to the second embodiment of the present invention, there is provided a process for the selective separation of uranium from accompanying metals and for its extraction by means of the treatment of an aqueous uranium solution with a collector, the foaming of the solution by the injection of an inert gas and the removal of the foam, as in the first embodiment, except characterized by the fact that sulfuric acid is added to a uranium-containing solution in an amount so that the uranium forms complex anions of the type $UO_2(SO_4)_m^{2-2m}$, wherein m equals 2 or 3, that a cationic surface active agent is added together with the sulfuric acid or after the addition of the sulfuric acid, to the uranium solution, that the solution is flotated in at least one flotation cell, separated in the known manner into a foam solution and a residual solution and that the uranium is recovered from the foam.

In the flotation process according to the second embodiment of the invention, iron is entrained in small amounts by the foam. However, even in the receiver it is not precipitated as a salt of low solubility and may therefore be removed practically completely by filtration. Following the passage through a second flotation stage, it can no longer be detected.

The applicant has found in a surprising manner that the uranium may be separated in a simple fashion from its accompanying metals when uranium solutions of hydrochloric acid or sulfuric acid are used in the flotation. The uranium forms complex dioxochlorouranates in hydrochloric acid solutions, said uranates having the following formula $$(UO_2Cl_n)^{2-n}$$

wherein n equals 3 or 4. In sulfuric acid solutions, uranium forms uranyl sulfate complexes of the formula $UO_2(SO_4)_2''$, $UO_2(SO_4)_3''''$ These relatively stable chloro and sulfate complexes of $UO_2^{2+}$ react surprisingly with cationic surface active agents to form finely crystalline precipitates having low solubilities.

These properties of uranium make possible its selective separation in the form of fine precipitates from solutions of the accompanying metals or from liquors of the wet processing of spent fuel rods from nuclear reactors. The precipitates are removed rapidly and quantitatively from the solution or liquor by means of microflotation and are concentrated in the foam solution. The great reduction in volume (the volume of the foam solution amounts at most to 2% of the original volume) leads to the formation of large aggregates of the precipitated particles, which may be separated readily by means of filtration and then processed further.

In the process according to the invention an aqueous uranium solution having a hydrochloric acid concentration of approximately 0.5 to 5N, preferably 1 to 3N, and most preferably about 2.5N, or a sulfuric acid concentration of approximately $10^{-5}N$ to 1.0N, preferably $10^{-3}N$ to 0.1N and most preferably approximately 0.05N, is used. The hydrochloric acid or sulfuric acid solution may be prepared in a known manner, by leaching uranium-containing ore or by adding the amount of hydrochloric acid or sulfuric acid required to existing solutions of uranium. The same is true for spent fuel from nuclear power plants. The hydrochloric acid or sulfuric acid solution may simultaneously contain up to 1.0N in fluoride ions.

The complex anions of uranium may be readily precipitated in a surprising manner and flotated with a cationic surface active agent. The concentration of the surface active agent added may—in contrast to the process disclosed in DT-AS No. 1,166,113—far exceed the critical micelle concentration and is limited only by the condition that the solubility product of the compounds of the surface active agent and the ions of the accompanying metals may not be exceeded.

The uranium is selectively separated in the course of a single or multiple stage flotation process from the accompanying metals. The accompanying metals either form no complexes with Cl or $SO_4$ ions or the complexes formed have low stability. When trivalent iron is present in high concentrations, slight amounts of the iron may be flotated out with the uranium. In such cases, the trivalent iron is reduced to bivalent iron prior to the flotation in a manner well known.

The relatively high stability of the dioxochlorouranates and uranyl sulfate complex thus renders possible the separation of uranium from nearly all metals accompanying it in nature, especially iron, aluminum and calcium. The process may be continuous or discontinuous.

A cationic surface active agent is used in the process according to the invention. There may be employed as the cationic surface agent, all surface active agents having one or several functional groups, which ionize in aqueous solution with the formation of positively charged organic ions. Examples are $C_{10}$-$C_{24}$ alkyl pyridinium salts, preferably $C_{14}$-$C_{18}$ alkyl pyridinium salts, wherein the alkyl group may be of the straight chain or branched chain type; alkyldimethylnaphthyl ammonium salts, preferably with $C_{12}$-$C_{18}$ alkyl groups, especially preferably the corresponding chlorides; $C_{14}$-$C_{18}$ Dialkyldimethylammonium salts. Particularly preferred in the process of the invention are N-cetylpyridinium chloride and sulfate and N-octadecylpyridinium chloride and sulfate. Polyelectrolytes having a surface active character may also be used as the surface active agents; these are included in the expression "surface active agent" as used in the present application. Mixtures of surface active agents and polyelectrolytes, or mixtures of surface active agents may also be employed. Examples of polyelectrolytes having surface active characters are N-alkyl-polyvinyl-pyridinium salts of the following formula:

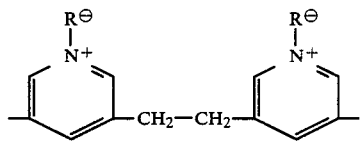

wherein R signifies a straight chain or branched chain alkyl group with 4 to 24, preferably 8 to 22 carbon atoms, and ⊖ a negatively charged ion.

The amount of the surface active agent to be added to the uranium-containing solution is determined by means of preliminary experiments. The surface active agent must be added at least in an amount so that the uranium will be quantitatively precipitated. In general, the surface active agent is added to the uranium solution in a molar amount that is 1 to 10 times the amount of the uranium. Preferably, 1 to 5 times, and particularly preferably 2 to 3 times the molar amount of the uranium is added. In chloride solutions especially good results are obtained when 3 moles of the surface active agent are added for 2 moles of uranium. In sulfate solutions the optimum ratio is 4 to 5 moles of surface active substance per mole of uranium. In each case the amount must be such that the solubility is exceeded.

According to the process of the invention, strongly diluted uranium solutions may be processed. The uranium concentration in the initial solution may be in the range of from about 0.1 to 0.0001%, and under certain conditions may even be as low as about 0.000001%.

The frothing of the reaction solution containing the uranium and the surface active agent is effected in a manner that is well known; an inert gas, for example nitrogen, is used in the foaming. However, air may also be employed. When using sulfuric acid, the duration of the flotation and the yield may be improved by having the initial solution contain, in addition to sulfuric acid, approximately the same concentration of sodium sulfate. The same holds for the addition of sodium chloride to hydrochloric acid solutions.

The reaction product of the surface active agent and the dioxochlorouranate ions or uranyl sulfate complex is flotated in a flotation cell and separated for example by means of filtration, sedimentation or centrifuging.

In the process according to the invention the uranium is separated from
(a) metals which do not form chloro or sulfate complexes;
(b) metals which only form chloro or sulfate complexes with low stability; and
(c) metals forming chloro or sulfate complexes with stabilities approaching that of $UO_2^{2+}$, but reacting with surface active agents to form salts having higher solubility products.

The process according to the invention is preferably carried out so that the surface active agent may be reused. The foam containing the precipitate is dehydrated as much as possible, for example, by means of filtration or centrifuging, and the precipitate is suspended in the smallest volume of water possible. The suspension of the precipitate is heated so that a solution is obtained. The solution in general has a pH value between 3 and 4. If necessary, it may be filtered again to remove impurities. However, this is not absolutely necessary. For heating, the suspension is passed preferably through a heat exchanger. A base, preferably ammonia, is added to the solution while it is still warm, to precipitate the uranium in the solution as the uranate. Aqueous ammonia, gaseous ammonia or sodium hydroxide, potassium hydroxide, lime water or other lyes may be employed as the base.

The uranium is precipitated as the uranate and the precipitate is separated, for example, by filtration, in a known manner, washed and further processed. A filtrate containing the surface active agent is obtained, which may be recycled into the flotation process.

It is also possible in the process according to the invention to process the hydrochloric acid solution obtained in the flotation cell in a conventional manner and to recycle it into the process. The sulfuric acid solution may be used several times after separation of the uranium, for example, to leach ores. The number of cycles depends upon the composition of the ore.

It is thus a substantial advantage of the process according to the invention that none of the chemicals used in the process is discharged in an effluent, but that said chemicals may be processed in a simple and inexpensive manner and thus recycled into the process.

The process according to the invention is schematically represented in the drawing attached hereto. In the process shown in the drawing, the ore is leached with a HCl and/or $H_2SO_4$ solution in the extractor 1. The acid solution containing uranium is passed into the homogenizer 3, equipped with an agitator 2, together with a solution of a suitable surface active agent. The concentration of the latter depends on the uranium content and the composition of the liquor and must be determined in a preliminary experiment. In the homogenizer 3, the dioxochlorouranate or dioxosulfatouranate ions immediately react with the interface active ions of the surface active agent, with the formation of precipitates having low solubilities.

From the homogenizer 3 the solution is passed into the flotation cell 4. In the cell the solution is separated by means of relatively intensive gassing into a foam and a residual solution. The foam is passed into a separating device 5 (conveyor, filtration, sedimentation, centrifuge) and dehydrated therein. The filtrate obtained in the device 5 has a volume of less than 1% of the volume of the original liquor and contains practically no uranium. Because of its high surface active agent content, it is recycled into the homogenizer 3.

The precipitate of the surface active agent and the dioxochlorouranate or uranyl sulfate complex is suspended with a small amount of water in the suspension installation 6 and carefully heated in a heating installation 7, for example, in a heat exchanger, until the precipitate just passes into solution. The solution is passed into a precipitating installation 8, wherein the pH value of the still acidic solution is increased by means of the addition of a base, for example $NH_3$, just to the point where the uranate is precipitated in the form of a low solubility uranate, for example, ammonium uranate. The uranate precipitate, for example, the ammonium uranate precipitate, is separated in a separation installation 9, for example, in a filtering device. The filtrate is again made acidic with HCl or $H_2SO_4$. The surface active agent crystallizes out during cooling within a short period of time as the chloride or sulfate. It may be recovered in the pure form or, prior to crystallization, it may be recycled to the homogenizer 3.

The residual solution remaining in the flotation cell 4 may—depending on its composition—be used in the extraction of ore (extractor 1) or passed into the processing installation 10 to recover the hydrochloric or sulfuric acid by means of a known process. The hydrochloric or sulfuric acid recovered again enters the extractor 1.

The process may be varied and is readily optimized in an individual case by the suitable choice of the concentration of the feed solution and the selection and suitable dosing of the surface active agent. It is possible, for example, to effect the flotation in a single step, or several flotation cells may be connected in series. The reagents essential for the process according to the invention, hydrochloric or sulfuric acid and the cationic surface active agent, may be recycled almost in their entirety.

The following examples will serve to further illustrate the invention.

EXAMPLE 1

In this example, the isolation by flotation of uranium from aqueous solutions of dioxochlorouranates is demonstrated.

0.042 g $UO_2(NO_3)_2.6H_2O$ (corresponding to 20 mg uranium) is dissolved in 450 ml of 0.3N HCl. In this solution the uranium is present as the anionic complex $(UO_2Cl_4)^{2-}$.

The solution contains no other metal besides uranium.

0.09 g cetylpyridinium chloride monohydrate (CPCl) is dissolved in 50 ml 0.3N HCl. The solution of the surface active agent is admixed with the uranium solution. Of the solution obtained, 10 ml are pipetted off for the analytical determination of uranium.

After a few minutes, the solution of uranium and the surface active agent clouds. The turbidity increases with time and becomes constant after approximately 20 minutes. The solution is then passed into a flotation cell. Flotation is effected with nitrogen from G2-frit. The flow rate is approximately 200 ml/min. The foam being formed is suctioned off at a height of approximately 20 cm above the original level of the liquid column. After a flotation period of 25 minutes, the surface active agent is almost completely flotated out. The flotation is then terminated. The volume of the foam and the residual solution are determined.

Associated uranylate/surface active agent is precipitated from the foam solution. It is centrifuged and analyzed. The residual solution is evaporated and the residue again analyzed. Following the destruction of the surface active agent by heating, the uranium content of both samples is determined spectrophotometrically with Arsenazo 300 in 0.1N HCl. The analytical results are summarized in Table I.

TABLE I

|  | V (ml) | C (mg/ml) | M (mg) | % |
|---|---|---|---|---|
| Initial solution | 490 | 0.0400 | 19.60 |  |
| Foam solution | 11 | 1.6471 | 18.12 | 92.12 |
| Residual solution | 479 | 0.0023 | 1.10 | 5.62 |

TABLE I-continued

|  | V (ml) | C (mg/ml) | M (mg) | % |
|---|---|---|---|---|
|  |  |  | Loss: | 1.93 |

Coefficient of concentration $C_F/C_O = 41.177$
Volume reduction factor $V_O/V_F = 44.545$ Herein and in the tables to follow hereinafter, the following symbols are used:
V = volume (ml)
M = total amount of metal in the volume (mg)
C = concentration (mg/ml)
O = original solution
F = foam solution
R = residual solution.

EXAMPLE 2

In this example, the separation by means of flotation of uranium from aqueous solutions which contain iron besides uranium, is illustrated.

Two solutions (A) and (B) are prepared. Solution A contains 20 mg uranium and 20 mg iron in 450 ml 3.0N HCl. Solution B contains 20 mg uranium and 200 mg iron in 450 ml 3.0N HCl.

Both solutions are mixed with 50 ml each of the surface active agent solution described in Example 1 and containing 0.09 g CPCl in 3.0N HCl. The uranium is flotated out from both solutions as described in Example 1. Processing of the foam and residual solutions also takes place as described in Example 1. The uranium and the iron are thus converted into their nitrates.

The nitrates are dissolved in distilled water, the iron is precipitated with sodium carbonate and the precipitate is filtered off, taken up with half-concentrated HCl. The iron is determined by means of titration with dichromate. The pH value of the alkaline filtrate of the iron precipitates is adjusted to 4. The uranium is precipitated with sodium hydroxide as the sodium diuranate and filtered off. The precipitate is dissolved in 0.1N HCl and the uranium determined spectrophotometrically. Analytical results are summarized in Table II.

TABLE II

|  | V (ml) | M (mg) U | M (mg) Fe | C (mg/ml) U | C (mg/ml) Fe | % U | % Fe | U/Fe |
|---|---|---|---|---|---|---|---|---|
| Initial Solution A: | 20 mg U - 0.0422 g $UO_2(NO_3)_2.6H_2O$ | | | | | | | |
|  | 20 mg Fe - 0.1447 g $Fe(NO_3)_3.9H_2O$ | | | | | | | |
|  | 0.09 g N—cetylpyridinium chloride (monohydrate) | | | | | | | |
| Foam Solution | 8.5 | 18.98 | 0.45 | 2.23 | 0.053 | 94.9 | 2.25 | 42.07 |
| Residual Solution | 491.5 | 0.52 | 18.23 | 0.001 | 0.037 | 2.6 | 91.15 | |
| Initial Solution B: | 20 mg U - 0.0422 g $UO_2(NO_3)_2.6H_2O$ | | | | | | | |
|  | 200 mg Fe - 1.447 g $Fe(NO_3)_3.9H_2O$ | | | | | | | |
|  | 0.12 g N—cetylpyridinium chloride (monohydrate) | | | | | | | |
| Foam Solution | 9.0 | 18.39 | 0.63 | 2.043 | 0.07 | 91.95 | 3.15 | 29.19 |
| Residual Solution | 491 | 0.32 | 197.2 | 0.0006 | 0.4016 | 0.16 | 98.6 | |

EXAMPLE 3

In this example is illustrated the separation by means of flotation of uranium from an aqueous solution containing calcium and aluminum in addition to the uranium.

In nature, uranium is nearly always accompanied by calcium and aluminum, in addition to iron. Even though the metals do not tend to form chloro complexes, their relatively high concentration in the liquors of lean uranium ores may reduce the uranium yield of the flotation and negatively affect the properties of the foam.

0.0422 g $UO_2(NO_3)_2.6H_2O$ (20 mg U), 0.7332 g $CaCl_2.2H_2O$ (200 mg Ca), 2,4682 g $Al_2(SO_4)_3.18H_2O$ (200 mg Al), 0.1 g N-cetylpyridinium chloride (monohydrate) are dissolved in 500 ml 3.0N HCl. Flotation and the processing of the foam and residual solutions take place as described in Example 1. Analytical results are summarized in Table III.

TABLE III

|  | V (ml) | M (mg) | C (mg/ml) | % |
|---|---|---|---|---|
| Initial solution | 490 | 19.6 | 0.04 |  |
| Foam solution | 11.5 | 18.49 | 1.61 | 94.33 |
| Residual solution | 478.5 | 0.5 | 0.001 | 2.55 |
|  |  |  | Loss: | 3.12 |

EXAMPLE 4

In this example the separation by means of flotation of uranium from a uranium-containing liquor is demonstrated.

500 g ground uranium ore, having the composition indicated in Table IV to follow hereinafter, are leached in 5 l of 1.5N HCl for 90 minutes at room temperature. The ore is then filtered off. The uranium concentration is analytically determined in a 100 ml sample of the filtrate.

The liquor is introduced into the homogenizer and mixed with a solution of the surface active agent [CPCl, cetylpyridinium chloride (monohydrate, 0.02 g/ml)] under constant agitation. The volume ratio of the liquor to the solution of the surface active agent is then chosen so that the $UO_2^{2+}$ and CPCl are present in an equivalent ratio of 2:3. The solution is then passed into the flotation cell at a rate of 40 ml/min. Flotation again takes place at room temperature and with a $N_2$ flow rate of 500 to 600 ml/min.

The foam solution, a total of 78 ml, is filtered off after the flotation and the sediment is dried and weighed. Following the destruction of the surface active agent (calcining) the concentrate is dissolved in concentrated nitric acid. After the separation of the rest of the accompanying metals, the uranium is determined spectrophotometrically. Results are summarized in Table IV.

TABLE IV

Results of the Continuous Flotation of Uranium from
Uranium-Containing Lean Ore Liquors
Fraction: 256 to 900 mesh/cm² (Test Sieve DIN 1171)

| Uranium-Containing Ore |  |
|---|---|
| Amount of uranium in 500 g ore, g | 0.7 |
| Weight % of uranium | 0.14 |
| Uranium-Containing Liquor |  |
| Uranium concentration, mg/ml | $12.64 \times 10^{-2}$ |
| Amount of uranium in 4900 ml liquor, g | 0.6194 |
| Total amount of uranium leached in % | 88.48 |

TABLE IV-continued

Results of the Continuous Flotation of Uranium from
Uranium-Containing Lean Ore Liquors
Fraction: 256 to 900 mesh/cm$^2$ (Test Sieve DIN 1171)

| of total uranium, % | |
|---|---|
| Concentrate | |
| Amount of concentrate, g | 2.8832 |
| Amount of uranium in concentrate, g | 0.5917 |
| Proportion of uranium in concentrate, % | 20.52 |
| Proportion of uranium in the concentrate using equivalent amounts of $UO_2Cl_4$ and CPCl, % | 22.5188 |
| Yield with respect to: | |
| (a) amount of uranium in the ore, % | 84.53 |
| (b) amount of uranium in the liquor, % | 95.52 |
| Residual Solution | |
| Volume, ml | 4822 ml |
| Uranium concentration, mg/ml | $6.72 \times 10^{-3}$ |
| Amount of uranium, g | 0.0324 |
| Proportion of uranium with respect to the amount of uranium in the liquor, % | 5.47 |
| Amount of the surface active agent used, g | 2.57 |

EXAMPLE 5

In 500 ml 0.1N $H_2SO_4$ are dissolved 214.6 mg $UO_2\cdot SO_4\cdot 2.5H_2O$. The solution is then mixed with 716 mg cetylpyridinium chloride (monohydrate) in 5 ml ethanol and agitated for 2 hours with a magnetic agitator. The sludge is then transferred to a flotation tube and gassed with nitrogen. The average flow velocity of the gas is 150 ml/min. The foam formed is suctioned into a 250 ml flask during the process, through a funnel and with the aid of an aspirator pump. Upon the completion of the flotation, the content of the receiver is filtered. The residue is dried, weighed and analyzed. Results are summarized in Table V.

TABLE V

| Uranium content in the initial solution | 119 mg/500 ml |
|---|---|
| Duration of flotation | 65 minutes |
| Volume of foam solution | 16 ml |
| Weight of the precipitate | 921 mg |
| Uranium content in the precipitate | 116.9 mg |
| Uranium yield | 98.23% |

EXAMPLE 6

In 500 ml 0.1N $H_2SO_4$ are dissolved 199.9 mg $Fe_2(SO_4)_3$. The solution is mixed with 716 mg cetylpyridinium chloride (monohydrate) in 5 ml ethanol and agitated for 2 hours. No turbidity is observed in the solution after the agitation. The solution is transferred to the flotation tube and flotated with nitrogen at the same flow velocity as in Example 5. The foam solution is again completely clear. Ten ml are pipetted from each of the foam and the residual solution, evaporated and the residues analyzed for iron, following the destruction of the surface active agent. Results are summarized in Table VI.

TABLE VI

| Iron content in the initial solution | 27.9 mg |
|---|---|
| Concentration in the initial solution ($C_o$) | 0.0558 mg/ml |
| Duration of flotation | 120 minutes |
| Volume of foam solution | 84 ml |
| Iron content of the residual solution | 22.9 mg |
| Concentration of the residual solution | 0.05504 mg/ml |
| Iron content of the foam solution | 4.78 mg |
| Concentration of the foam solution ($C_F$) | 1.019 |

EXAMPLE 7

In one of two flasks containing 500 ml of 0.1N $H_2SO_4$ there are dissolved 214.6 mg $UO_2SO_4\cdot 2H_2O$ and 199.9 mg $Fe_2(SO_4)_3$ (Solution 2). Each of the solutions is mixed with 716 mg cetylpyridinium chloride (monohydrate) in 5 ml ethanol and agitated for 2 hours. Flotation and processing follow as in Example 5. Results of the analysis are summarized in Table VII.

TABLE VII

| | Solution 1 | Solution 2 |
|---|---|---|
| Amount of uranium in the initial solution | 119 mg | 119 mg |
| Amount of iron in the initial solution | 55.8 mg | 558 mg |
| U/Fe ratio | 2.13 | 0.213 |
| Duration of flotation | 40 min | 35 min |
| Weight of precipitate | 932 mg | 928 mg |
| Amount of uranium in the precipitate | 115.4 mg | 114.4 mg |
| Amount of iron in the precipitate | 2.3 mg | 3.8 mg |
| U/Fe ratio | 50.13 | 30.10 |
| Uranium yield | 96.9% | 96.13% |

What is claimed is:

1. A process for the selective separation of uranium from metals accompanying it in a uranium-containing ore, comprising the steps of:
   (a) preparing a uranium- and iron-containing solution by dissolving a uranium- and iron-containing ore in an aqueous medium;
   (b) adding to said solution
       hydrochloric acid in an amount sufficient to form complex anions of the type $(UO_2Cl_n)^{2-n}$ wherein
   n is 3 or 4,
   (c) adding to said solution a cationic surface active agent which forms a relatively insoluble precipitate with said complex anion;
   (d) subjecting the solution containing said precipitate to a gas flotation step to produce a foam fraction containing the precipitates and a liquid fraction;
   (e) separating said foam fraction from said liquid fraction; and
   (f) recovering uranium from said foam fraction.

2. A process for the selective separation of uranium from metals accompanying it in an aqueous uranium-containing solution, comprising the steps of:
   (a) adding to an aqueous uranium-containing solution which also contains iron
       (i) hydrochloric acid in an amount sufficient to form complex anions of the type $(UO_2Cl_n)^{2-n}$ wherein
   n is 3 or 4, or (ii) sulfuric acid in an amount sufficient to form complex anions of the type $$UO_2(SO_4)_m^{2-2m}$$

wherein
m is 2 or 3;

(b) adding to said solution a cationic surface active agent which forms a relatively insoluble precipitate with said complex anion, said surface active agent being added in an amount higher than its critical micelle concentration;

(c) subjecting the solution containing said precipitate to a gas flotation step to produce a foam fraction containing the precipitate and a liquid fraction;

(d) separating said foam fraction from said liquid fraction; and recovering uranium from said foam fraction by:

(e) dehydrating the foam containing the precipitate;

(f) suspending the precipitate in a relatively small amount of water;

(g) heating the suspension until a solution is formed;

(h) precipitating the uranium from said solution by means of raising the pH value; and (i) separating the precipitate from the residual liquid containing the surface active agent.

3. A process according to claim 1, wherein recovery step (f) comprises substantially dehydrating the foam containing the precipitate, suspending the precipitate in a relatively small amount of water, heating the suspension until a solution is formed, precipitating the uranium from said solution by means of raising the pH value, and separating the precipitate from the residual liquid containing the surface active agent.

4. A process according to claim 1 or 2, wherein the aqueous uranium-containing solution resulting from step (b) is an aqueous hydrochloric acid solution having a concentration of from about 0.5N to 5N HCl.

5. A process according to claim 2, wherein the aqueous uranium-containing solution resulting from step (a) is an aqueous sulfuric acid solution having a concentration of from about $10^{-5}N$ to 1N $H_2SO_4$.

6. A process according to claim 2, wherein the acid is sulfuric acid, and said process further comprises adding to said solution sodium sulfate.

7. A process according to claim 6, wherein the aqueous uranium-containing solution is from about $10^{-5}N$ to 1N sulfuric acid and from about $10^{-5}N$ to 1N in sodium sulfate.

8. A process according to claim 1, 2, 5, 6 or 7, wherein said cationic surface active agent comprises a long chain alkyl pyridinium salt, an alkyldimethylnaphthyl-ammonium salt, an dialkyl dimethylammonium salt, or a mixture of these compounds.

9. A process according to claim 1, 2, 5, 6 or 7, wherein said cationic surface active agent comprises N-cetylpyridinium chloride or N-octadecylpyridinium chloride.

10. A process according to claim 1, 2, 5, 6 or 7, wherein the surface active agent is added in a molar equivalent amount of from about 1 to 10 times with respect to the uranium in solution.

11. A process according to claim 1 or 2, wherein the process is carried out continuously.

12. A process according to claim 1 or 2, wherein said gas flotation step includes a plurality of flotation substeps carried out sequentially.

13. A process according to claim 1 or 2, wherein said gas used for said gas flotation step comprises nitrogen or air.

14. A process according to claim 1 or 2, wherein the solution to be processed, in addition to uranium, also contains iron, calcium, and aluminum in minor concentrations, and also up to about 1N in fluoride ions.

15. A process according to claim 1 or 2, wherein said solution further contains relatively large amounts of $Fe^{3+}$, and including the step of reducing said $Fe^{3+}$ prior to the separation step.

16. A process according to claim 1 or 2, further comprising the step of recycling said residual liquid containing the surface active agent to said step of adding said surface active agent.

17. A process according to claim 16, further comprising the step of recycling said liquid fraction from said flotation step back to said step of adding acid.

18. A process according to claim 4, wherein the aqueous uranium-containing solution is from about 0.5N to 5N HCl and from about 0.5N to 5N NaCl.

19. A process according to claim 2, wherein step (a) comprises adding to the aqueous uranium-containing solution hydrochloric acid in an amount sufficient to form complex anions of the type $$(UO_2Cl_2)^{2-n}$$

wherein n is 3 or 4.

20. A process according to claim 2, wherein said solution further comprises at least one metal selected from the group comprising calcium, aluminium, strontium, barium, magnesium, boron, cerium, zinc, copper, molybdenum, manganese, lead, tin, zironium and vanadium.

21. A process according to claim 20, wherein said metal comprises at least one metal selected from the group comprising calcium and aluminium.

22. A process according to claim 21, wherein the concentration of iron or said metal is at least approximately equal to the concentration of the uranium.

23. A process according to claim 21, wherein the concentration of iron or said metal is substantially greater than the concentration of said uranium.

24. A process according to claim 21, wherein the concentration of iron or said metal is at least 10 times greater than the concentration of said uranium.

25. A process for the selective separation of uranium from metals accompanying it in a uranium-containing ore, comprising the steps of:

(a) preparing a uranium- and iron-containing solution by dissolving a uranium- and iron-containing ore in an aqueous medium;

(b) adding to said solution sulfuric acid in an amount sufficient to form complex anions of the type $$UO_2(SO_4)_m^{2-2m}$$

wherein
m is 2 or 3;

(c) adding to said solution a cationic surface agent comprising cetyl pyridinium chloride;

(d) subjecting the solution containing said precipitate to a gas flotation step to produce a foam fraction containing the precipitate and a liquid fraction;

(e) separating said foam fraction from said liquid fraction; and (f) recovering uranium from said foam fraction.

* * * * *